United States Patent
Stojakovic et al.

(10) Patent No.: US 11,272,139 B2
(45) Date of Patent: Mar. 8, 2022

(54) USER INTERFACE FOR VIDEO CALL WITH CONTENT SHARING

(71) Applicant: SONY CORPORATION, Tokyo (JP)

(72) Inventors: Miro Stojakovic, Tygelsjö (SE); Jacob Fyge, Bjärred (SE); Bo Do, Malmö (SE); Daniel Johansson, Lund (SE); Maximiliano Gabriel, Lund (SE); Roger Olsson, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/586,998

(22) Filed: Sep. 29, 2019

(65) Prior Publication Data

US 2020/0128209 A1 Apr. 23, 2020

(30) Foreign Application Priority Data

Oct. 18, 2018 (SE) .................................... 1851286-3

(51) Int. Cl.
*H04N 7/14* (2006.01)
*G06F 9/451* (2018.01)
(Continued)

(52) U.S. Cl.
CPC ............. *H04N 7/147* (2013.01); *G06F 3/041* (2013.01); *G06F 3/0487* (2013.01);
(Continued)

(58) Field of Classification Search
CPC combination set(s) only.
See application file for complete search history.

(56) References Cited

U.S. PATENT DOCUMENTS

2004/0224772 A1 11/2004 Canessa
2008/0168379 A1 7/2008 Forstall et al.
(Continued)

FOREIGN PATENT DOCUMENTS

CN 105635846 A 6/2016
WO 2013152454 A1 10/2013

OTHER PUBLICATIONS

Office Action and Search Report from corresponding Swedish Patent Application No. 1851286-3, dated Apr. 15, 2019, 7 pages.
(Continued)

*Primary Examiner* — Duc Nguyen
*Assistant Examiner* — Assad Mohammed
(74) *Attorney, Agent, or Firm* — Tucker Ellis LLP

(57) ABSTRACT

A user interface and method for establishing a video call to share data associated with a software application executed on an electronic device. One or more first selectable user interface objects representing software applications installed on the electronic device, one or more second selectable UI objects representing contacts of a user of the electronic device and a third selectable UI object related to executing a video call are displayed on the touch-sensitive display. A selection of one of the first selectable UI objects and a selection of the second selectable UI objects are determined. Upon detecting a touch input selecting of the third selectable UI object, the software application selected by the determining is executed, and a video call is established between the first electronic device and a second electronic device of the contact selected by the determining in order to exchange data associated with the software application.

17 Claims, 8 Drawing Sheets

(51) Int. Cl.
*G06F 3/041* (2006.01)
*G06F 3/0487* (2013.01)
*G06F 3/14* (2006.01)
*G10L 15/26* (2006.01)
*H04N 7/15* (2006.01)

(52) U.S. Cl.
CPC ............ *G06F 3/1454* (2013.01); *G06F 9/451* (2018.02); *G10L 15/26* (2013.01); *H04N 7/15* (2013.01)

(56) References Cited

U.S. PATENT DOCUMENTS

| | | | |
|---|---|---|---|
| 2012/0150956 A1* | 6/2012 | Tucker | H04L 12/1818 709/204 |
| 2012/0178536 A1 | 7/2012 | Oh | |
| 2012/0287231 A1* | 11/2012 | Ravi | H04W 12/50 348/14.12 |
| 2013/0321340 A1* | 12/2013 | Seo | G06F 3/04817 345/174 |
| 2014/0380239 A1* | 12/2014 | Kang | G06F 3/04842 715/810 |
| 2015/0029295 A1* | 1/2015 | Gupta | H04M 3/5116 348/14.01 |
| 2015/0201159 A1 | 7/2015 | Liu | |
| 2015/0352446 A1 | 12/2015 | Ma | |
| 2016/0021336 A1* | 1/2016 | Abbott | H04N 7/147 348/14.02 |
| 2017/0109122 A1 | 4/2017 | Schmidt | |
| 2018/0121214 A1 | 5/2018 | Faulkner | |
| 2018/0203577 A1* | 7/2018 | Astavans | H04N 7/147 |
| 2018/0309806 A1* | 10/2018 | Huynh | G06F 3/04886 |

OTHER PUBLICATIONS

Extended European Search Report from corresponding European Application No. 19196325.5, dated Feb. 28, 2020, 7 pages.

* cited by examiner

1)

2)

USER INTERFACE FOR VIDEO CALL WITH CONTENT SHARING

RELATED APPLICATION DATA

This application claims the benefit of Swedish Patent Application No. 1851286-3, filed Oct. 18, 2018, the disclosure of which is incorporated herein by reference in its entirety.

TECHNICAL FIELD

The disclosure relates generally to a user interface for establishing a video call to share data associated with a software application executed on an electronic device. More specifically, the disclosure relates to setting up such a video call. The disclosure also relates to a corresponding electronic device, to a computer program for performing the method and to a computer program product.

BACKGROUND

Mobile devices such as smart phones and tablets have opened up a variety of new services that can be provided to users. A popular and growing category of these new services is for users participating in a video call to also share other content associated with e.g. a software application running in one of the user's electronic device. For example, users might want to play a game, share images or watch YouTube together, while also communicating via real-time video.

Today there are some applications on the market that support real-time sharing of content. For example, the YouTube Gaming app provides a live streaming feature. This feature allows a user to choose game to share, to choose a configuration of stream and friend to invite. However, to achieve this, the user has to go several views/pages where user input is requested and where information is provided to the user. However, every view/choice increases the risk that a user will drop off before they arrive at the actual content. Consequently, many users will never end up actually using the feature.

SUMMARY

An object of embodiments herein is to provide an improved user interface for setting up and executing a video call with content sharing between two users.

According to a first aspect, the disclosure relates to a method performed at a first electronic device with a touch-sensitive display. The method comprises displaying on the touch-sensitive display one or more first selectable user interface, UI, objects representing software applications installed on the electronic device, one or more second selectable UI objects representing contacts of a user of the electronic device and a third selectable UI object related to executing a video call. The method further comprises determining selection of one of the first selectable UI objects and determining selection of the second selectable UI objects. The method also comprises, upon detecting a touch input selecting of the third selectable UI object, executing the software application selected by the determining, and establishing a video call between the first electronic device and a second electronic device of the contact selected by the determining in order to exchange data associated with the software application. Thereby, a video call that users may use to share content is established in a user friendly way.

In some embodiments, the establishing comprises receiving, from the second electronic device, a first data stream comprising video data captured by a camera of the second electronic device. In some embodiments, the establishing comprises sending, to the second electronic device, a second data stream comprising a live steam comprising full-screen content of the touch-sensitive display. Thereby, the user of the first electronic device may share content with a user of a second electronic device.

In some embodiments, the establishing comprises sending, to the second electronic device video data captured by a camera of the first electronic device and information identifying the software application selected by the second touch input. Thereby, (the user of a) second electronic device knows which software application to launch.

In some embodiments, the method comprises displaying video data exchanged through the video call in at least one foreground inset display area that overlaps a background display area displayed on the touch-sensitive display. Thereby, the users may see each other all the time during the call, even when sharing other content such as a game. In some embodiments, a full-screen presentation of the executed software application is displayed in the background display area.

In some embodiments, the software applications comprises games, media players, web browsers, or any other software applications.

In some embodiments, wherein the establishing is performed based on a fourth touch input selecting a fourth selectable UI object representing a streaming mode.

According to a first aspect, the disclosure relates to first electronic device, comprising a touch-sensitive display a control unit configured to display on the touch-sensitive display one or more first selectable user interface, UI, objects representing software applications installed on the electronic device, one or more second selectable UI objects representing contacts of a user of the electronic device; and a third selectable UI object related to executing a video call. The control unit is also configured to determine selection of one of the first selectable UI objects, determine selection of the second selectable UI objects; and to upon detecting a touch input selecting of the third selectable UI object, execute the software application selected by the determining, and establish a video call between the first electronic device and a second electronic device of the contact selected by the determining in order to exchange data associated with the software application.

In some embodiments, the control unit is configured to receive from the second electronic device, a first data stream comprising video data captured by a camera of the second electronic device.

In some embodiments, the control unit is configured to send, to the second electronic device, a second data stream comprising a live steam comprising full-screen content of the touch-sensitive display.

In some embodiments, the control unit is configured to send, to the second electronic device, video data captured by a camera of the first electronic device and information identifying the software application selected by the second touch input.

In some embodiments, the control unit is configured to display video data exchanged through the video call in at least one foreground inset display area that overlaps a background display area displayed on the touch-sensitive display.

In some embodiments, a full-screen presentation of the executed software application is displayed in the background display area.

In some embodiments the control unit is configured to establish the video call based on a fourth touch input selecting a fourth selectable UI object representing a streaming mode.

According to a third aspect of embodiments herein it is provided a computer program comprising instructions which, when the program is executed by a computer, cause the computer to carry out the method according to the first aspect.

According to a fourth aspect of embodiments herein it is provided a computer-readable medium comprising instructions which, when executed by a computer, cause the computer to carry out the method according to the first aspect.

DETAILED DESCRIPTION

Figure 1:
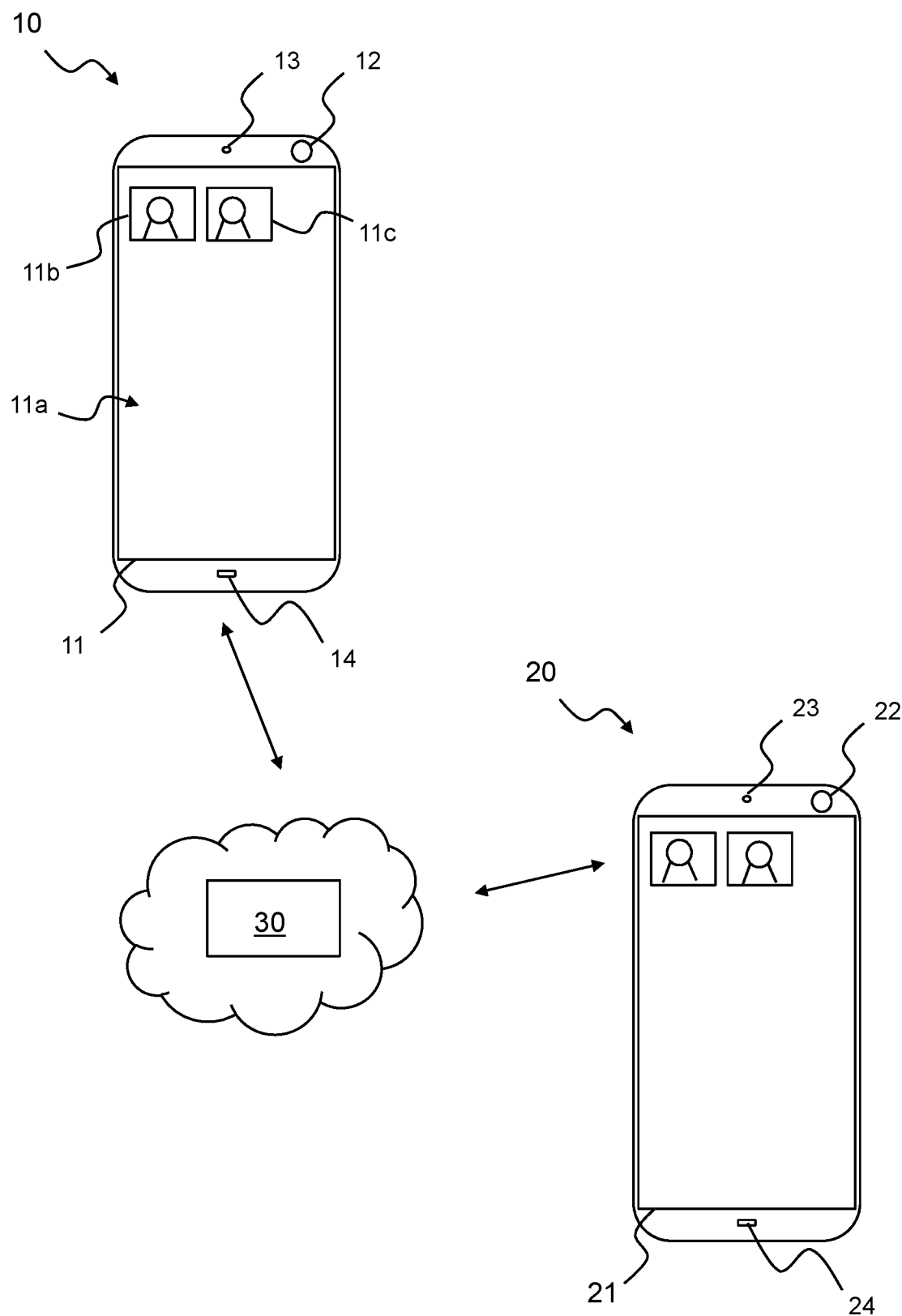
FIG. 1 illustrates two electronic devices participating in a video call.

Embodiments will now be described with reference to the drawings, wherein like reference numerals are used to refer to like elements throughout.

The solutions for simultaneously sharing content and video that are available today usually guides the user through many screens and choices to be able to setup a video call and screen sharing a launched application. Knowing, from e.g. user engagement statistics, that some users generally drop off for every view/choice they have to do before getting to the actual content, not many users will end up actually using the service.

This disclosure proposes a user interface, for use in electronic devices that enables a user to share an application with another user i.e. a friend using a video call. The user interface guides the user through configurations of the video call, friend selection, application selection, screen sharing configuration and finally launch of app streaming session and selected application.

FIG. 1 illustrates a first electronic device 10 and a second electronic device 20 participating in a video call while sharing content, such as a software application. The first electronic device 10 and a second electronic device 20 respectively comprises a touch-sensitive display 11, 21, a camera 12, 22, a speaker 13, 23 and a microphone 14, 24.

For example, the user of the first electronic device 10 plays a game and also shares his or her touch-sensitive display 11 with the user of the second electronic device 20, while playing the game. A composite display is presented on the first electronic device 10. The composite display is a picture-in-picture display that includes at least two display areas that show two different videos where one of the display areas is a background main display area 11a and the others are a foreground inset display area 11b, 11c that overlaps the background main display area.

In this example, the game is displayed in the background main display area 11a, while video call data, herein referred to as chat heads, is displayed in the foreground inset display areas. The video call may be established using any platform for media sharing. The platform is typically at least partly implemented in a remote server 30, such as a cloud server.

Figure 2:
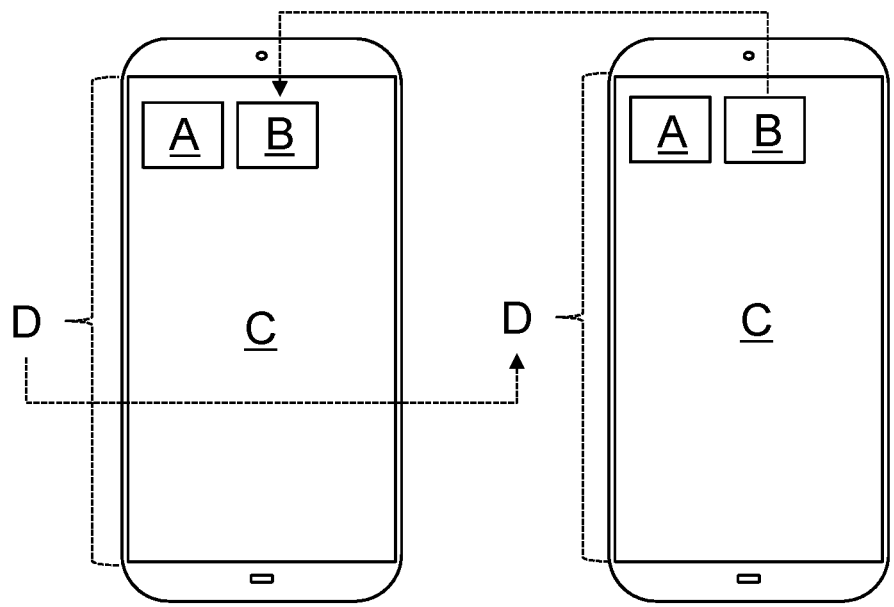
FIG. 2 illustrates data streams sent between two electronic devices according to one example implementation.

FIG. 2 illustrates data streams communicated between two electronic devices 10, 20 when sharing a software application while participating in a video call according to one example implementation. In this example the second electronic device 20 sends real-time video data captured by a camera 22 of the second electronic device 20 to the first electronic device 10. A composite display where a software application is running in full-screen in the background, while the received video data is presented in a first inset A that overlaps the background main display area C, is created in the first electronic device 10. Video data captured by a camera 12 of the first electronic device 10 is presented in a second inset B. The full composite display (denoted D) is sent from the first electronic device 10 to the second electronic device 20 in real-time.

Figure 3:
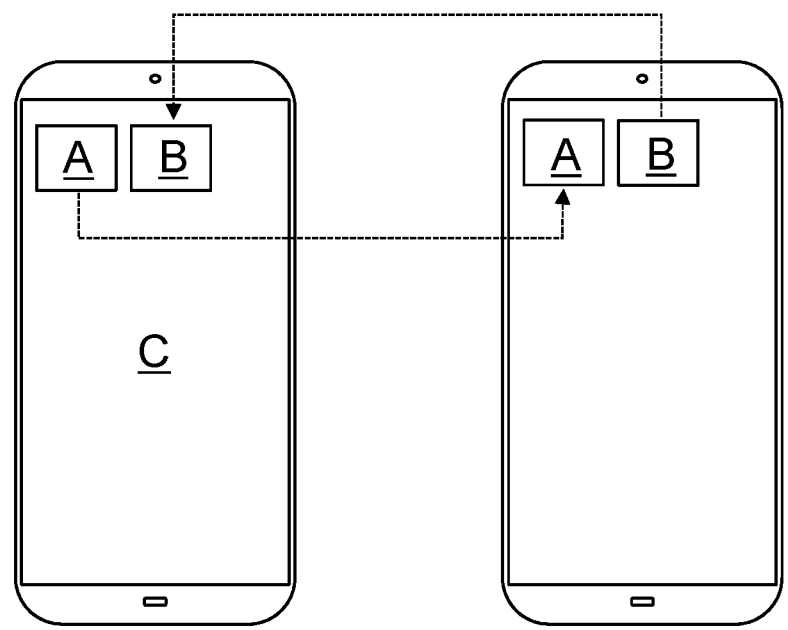
FIG. 3 illustrates data streams sent between two electronic devices according to another example implementation.

FIG. 3 illustrates data streams sent between the two electronic devices 10, 20 according to another example implementation. In this example the second electronic device 20 also sends real-time video data captured by a camera 22 of the second electronic device 20 to the first electronic device 10. However, in this example, the screen of the first electronic device 10 is not shared. Instead the first electronic device 10 sends real-time video data captured by a camera 12 of the first electronic device 10 to the second electronic device 20. In addition, information about the software application is communicated to the second electronic device 20. The information is e.g. the name of the application, and possibly also other context data, such as user data. The information is either embedded in the data stream or sent separately. In this way the users may share e.g. a software application running via a platform that both users has access to. For example, the second user may start the same software application and session/server as the first user. Alternatively, the software in the second electronic device 20 starts the software application automatically in the second device.

Figure 4A:
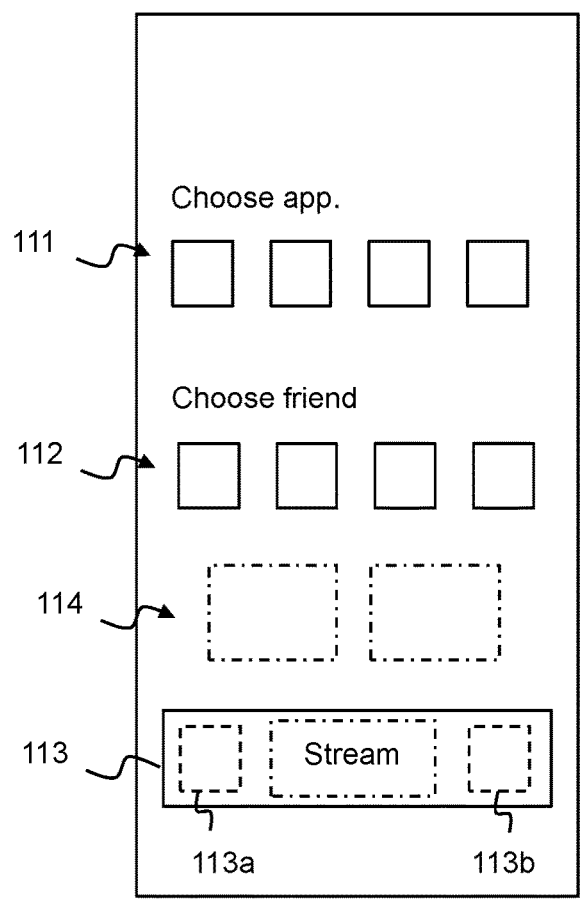
FIG. 4A to 4D illustrates an example of a user interface of a first electronic device.
Figure 4B:
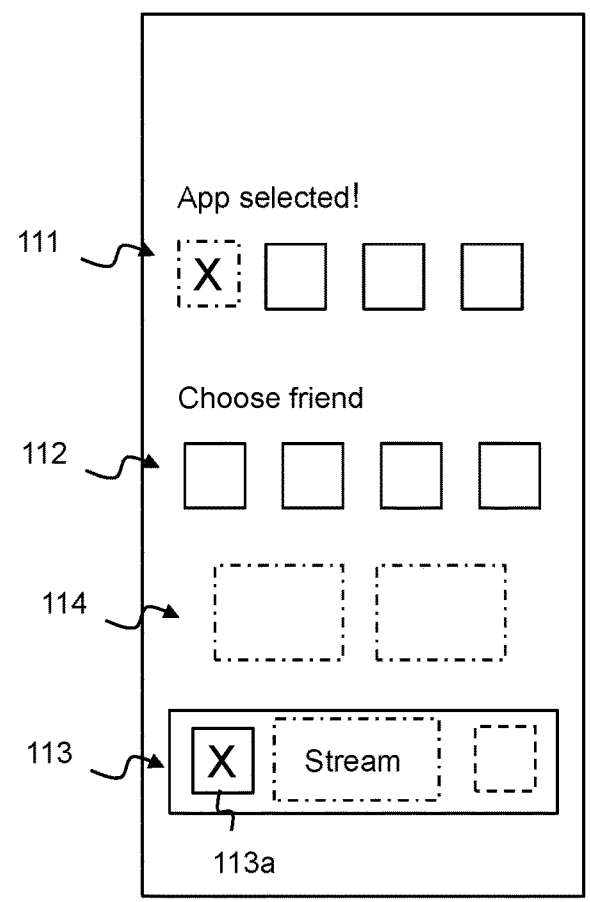
Figure 4C:
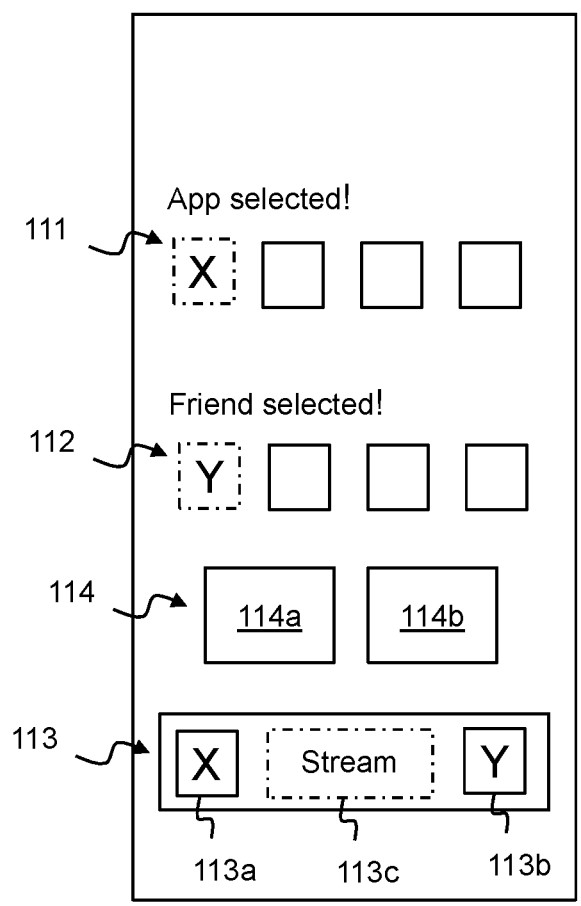
Figure 4D:
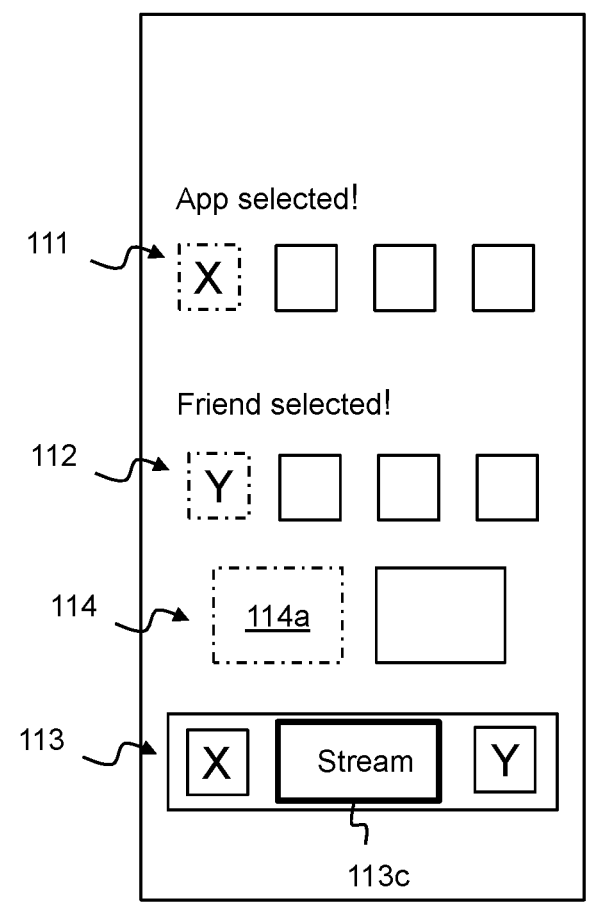
Figure 5:
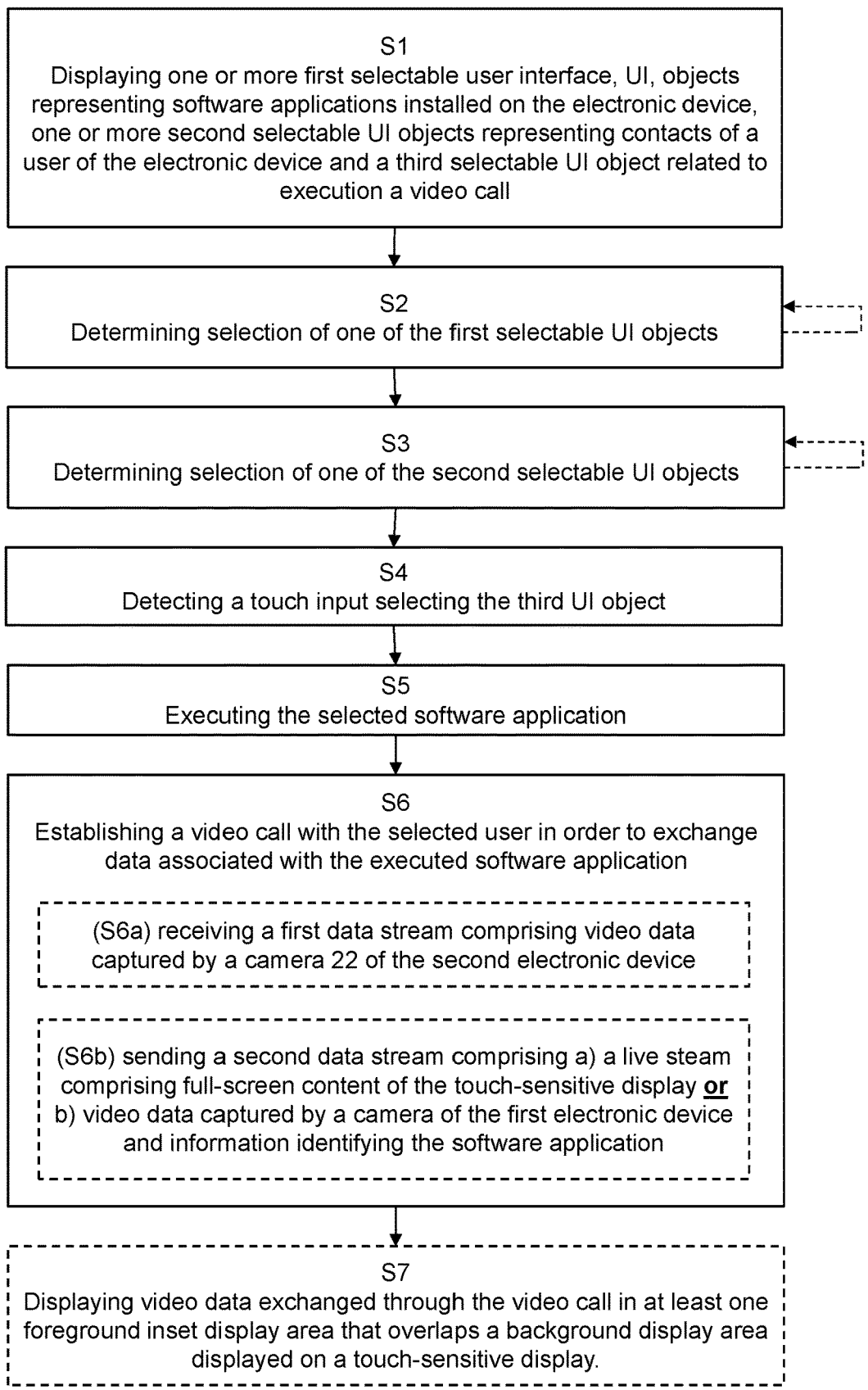
FIG. 5 illustrates a flow chart of the method according to the first aspect.

The proposed user interface for setting up a video call with content sharing will now be described with reference to FIG. 4A to 4D and FIG. 5. FIG. 4A to 4D illustrate an example of a user interface of a first electronic device. FIG. 5 illustrates a flow chart of the method according to the first aspect.

The method can be executed at any time and is initiated by the user of the first electronic device 10, e.g. by the user starting a special software application (e.g. a streaming/gaming app) for this service. The user has typically registered to this service and possibly also invited friends (also referred to as contacts). The first time the software application is started an account typically has to be selected.

The method comprises displaying S1 on the touch-sensitive display 11 one or more first selectable user interface, UI, objects 111, one or more second selectable UI objects 112 and the third selectable UI object 113. The selectable UI objects are illustrated simultaneously on the touch-sensitive display 11, as illustrated in FIG. 4A. In the illustration of FIG. 4A, the first selectable UI objects are displayed in an upper part of the touch-sensitive display 11, the second selectable UI objects are displayed below the first selectable UI objects and the third selectable UI object is displayed on the lower part of the touch-sensitive display 11.

The first selectable user interface, UI, objects 111 represent other software applications installed on the electronic device. Examples of software applications are games, media players, web browsers, or any other software applications. The software application may be presented in an order that is based on e.g. use or in alphabetic order. For example, the most recently used software application is presented first. If there are many software applications installed, then only a subset of the software applications may fit on the part of the touch-sensitive display 11 dedicated for the first selectable UI objects. The user may scroll to the hidden UI objects e.g. by swiping a finger on the touch-sensitive display 11.

The one or more second selectable UI objects 112 represent contacts of a user of the electronic device 10. Contact lists, in an electronic form, are digital equivalents to their paper-based progenitors. Electronic contact lists are databases that are used for storing entries that are now colloquially known by users as "contacts" or "friends". The information stored in these contact entries ("contact information") may include without limitation: (i) names; (ii) pictures or avatars associated with the names; (iii) various phone numbers (i.e., home, work, cellular, etc.); (iv) e-mail addresses (e.g., both personal and work-related); (v) fax numbers; (vi) user names or profiles associated with various services (i.e., instant messaging applications, Facebook™' Twitter™, etc.); and (vii) various other related information associated with a user (i.e., birthdays, favorite things, names of related family members, anniversary dates, information on how met or introduced, actual physical addresses of their residence or work, etc.). The contacts are typically previously registered as "friends" in the platform for media sharing by the user of the first electronic device 10. This is e.g. done by sending so called "friend requests". The contacts may be presented in an order that is based on e.g. use or in alphabetic order. If the user has many contacts then only a subset of the contacts may fit on the part of the touch-sensitive display 11 dedicated for the second selectable UI objects 112. The user may scroll to the hidden UI objects e.g. by swiping a finger on the touch-sensitive display 11.

The third selectable UI object 113 related to execution of a video call. The third selectable UI object 113 typically comprises a launch button 113c. In some embodiments, the third selectable UI object 113 also comprises a preview field that shows selected (or pre-selected) user/software application (e.g. a game) and contact. In some embodiments, the launch button 113b is disabled (e.g. grey and not selectable) in the first screen, i.e. before a software application and a contact is selected. A disabled button is herein illustrated by a dash dotted line.

The method further comprises determining S2 selection of one of the first selectable UI objects 111 (denoted "X"). In some embodiments, the determining S2 comprises detecting a touch input on one of the first selectable UI objects 111. Alternatively, the last executed software application is selected as default, if no touch input selecting one of the other first selectable UI objects 111 is detected. In some embodiments, the selection ("X") is visually indicated by e.g. changing color or contour of the selected UI objects 111 or by a text (e.g. "App selected!"), as illustrated in FIG. 4B.

In some embodiments, the selected software application ("X") is also indicated in a preview filed 113a of the launch button 113.

The method further comprises determining S3 selection of one of the second selectable UI objects 112 (denoted "Y"). In some embodiments, the determining S3 comprises detecting a touch input on one of the second selectable UI objects 112. Alternatively, the last called friend is selected as default, if no touch input selecting one of the other second selectable UI objects 112 is detected. In some embodiments, the selection ("Y") is visually indicated by e.g. changing color or contour of the selected UI objects 112 or by a text (e.g. "Friend selected!"), as illustrated in FIG. 4C. In some embodiments, the selected friend ("Y") is also indicated in a preview filed 113b of the launch button 113.

In some embodiments, the selection may be performed again i.e. the user may change his mind and make a new selection. This is indicated by the arrow in FIG. 5.

Once a software application and a friend are selected the user can start the video call i.e. the media streaming. In some embodiments, the third selectable UI object 113 is enabled once a software application ("X") and a friend ("Y") are selected. This is e.g. visualized by changing the visual properties of the third selectable UI object 113, as illustrated by a solid line in FIG. 4D. For example, it is changed from grey-scale to color. In some embodiments the selected software application ("X") and friend ("Y") are shown in the pre-view fields 113a, 113b of the third selectable UI object 113. In this way a user can easily see which software application will be launched and which friend will be called.

When a user of the first electronic device 10 touches the third selectable UI object 113, the selected application is launched and the video call is established. In other words, the method further comprises, upon detecting S4 a touch input selecting of the third selectable UI object 113, executing S5 the software application selected by the determining S2 and stablishing S6 a video call between the first electronic device 10 and a second electronic device 20 of the contact selected by the determining S3 to exchange data associated with the software application.

In some embodiments, the user may select which streaming mode to use, e.g. by touching a selectable UI object, referred to as a fourth selectable UI object 114. The fourth selectable UI object 114 presents two or more different streaming modes. In the illustrated example the user may select between screen sharing 114a and chat heads only 114b. In other words, in some embodiments, the establishing S6 is performed based on a fourth touch input selecting a fourth selectable UI object 114 representing a streaming mode.

The video call comprises at least two data streams, a first data stream transmitted from the second electronic device 20 to the first electronic device 10 and a second data stream transmitted from the first electronic device 10 to the second electronic device 20. The data streams comprises video/screen data and audio data captured by the microphones 14, 24. The content of (at least) the first data stream depends on the streaming mode. The video call may comprise further streams. Also other information may be communicated between the electronic devices 10, 20 during the call.

The first data stream typically comprises video data captured by the front facing camera 22 of the second electronic device 20. In other words, in some embodiments, the establishing S6 comprises receiving S6a, from the second electronic device, a first data stream comprising video data captured by a camera 22 of the second electronic device.

There are different ways of exchanging data associated with the software application. One way is to simply share the screen of the first electronic device as described above in connection with FIG. 2. For example, the screen of the first electronic device 10 is shared with the second electronic device, such that the same screen is shown on both electronic devices 10, 20. In other words, in some embodiments, the establishing S6 comprises sending S6b, to the second electronic device, a second data stream comprising a live steam comprising full-screen content of the touch-sensitive display 11.

Alternatively, only the "chat heads" are streamed (see FIG. 3) in the video call and the software application is launched individually on the first and second electronic devices. In other words, in some embodiments, the establishing S6 comprises sending S6b, to the second electronic device, a second data stream comprising video data captured by a camera 12 of the first electronic device and information identifying the software application selected by the second touch input. The information identifying the software application selected by the second touch input enables the user of the second electronic device to launch the same software application. This may be done manually by the user reading information about the software application displayed on the screen. Alternatively, the second electronic device may automatically launch the same software application based on the information identifying the software application selected by the second touch input. In some embodiments further information is exchanged between the devices, such as user context or session ID. Thereby, game sharing may be further facilitated.

During the video call further data and/or streams may be send between the electronic devices 10, 20. For example, in the screen sharing mode, a user of the second electronic device may be allowed to insert guide commands that are transmitted to the first electronic device. For example, user input provided on the touch-sensitive display 21 of the second electronic device 20 may be visualized on the touch-sensitive display 11 of the first electronic device 10.

It may also be possible to give the user of the second electronic device 20 control to the touch screen of the first electronic device 10. In other words, the touch input provided on the second electronic device 20 will be sent to the first electronic device 10. The first electronic device 10 may then ignore touches on its own touch-sensitive display 11 and instead apply the touches received from the second electronic device 20.

In some embodiments, users can overlay masks and/or general animation objects on each other's chat heads. For example, the user of the first electronic device may choose to overlay sunglasses on his/her chat head and transform the other user's chat head to a horse head. The users may also send animation objects to each other, which objects are then shown on a main background screen. E.g. a user sends a snow fall object which is animated on the other user's screen. The objects mentioned are provided by the software application.

Once the video call is established, the users can see each other in the "chat heads" inserted on top of the main background screen. In other words, in some embodiments, the method comprises displaying S7 video data exchanged through the video call in at least one foreground inset display area that overlaps a background display area displayed on the touch-sensitive display 11. A full-screen presentation of the executed software application is typically displayed in the background display area.

Next time the application is executed the previously used user/application is pre-selected. Thus, the user may simply start the application and then immediately press the launch button 114c.

The user interface has herein been described with reference to a video call between two users. However, it must be appreciated that the same user interface may also be used for establishing a video call between multiple parties.

Figure 6:
FIG. 6 illustrates an example of a user interface of a second electronic device.

FIG. 6 illustrates an example of a user interface of a second electronic device 20. When the first electronic device attempts to establish the video call the second electronic device receives information about incoming video call. The information typically comprises information about the executed software application.

A user interface for accepting the call is then shown on the touch-sensitive display 21 of the second electronic device 20. The interface may be similar to the one used for normal video calls. In addition information about the software application running in the first electronic device may be presented. In some embodiments, the inserts 11b and 11c (FIG. 1) are presented on the user interface for accepting the call. The video data from the first electronic device may then be replaced by a profile image of the user of the first electronic device 10. If the user of the second electronic device accepts the call the video call will be established and the user interface comprising the composite display will be shown, as described in relation to FIG. 2 and FIG. 3.

Figure 7:
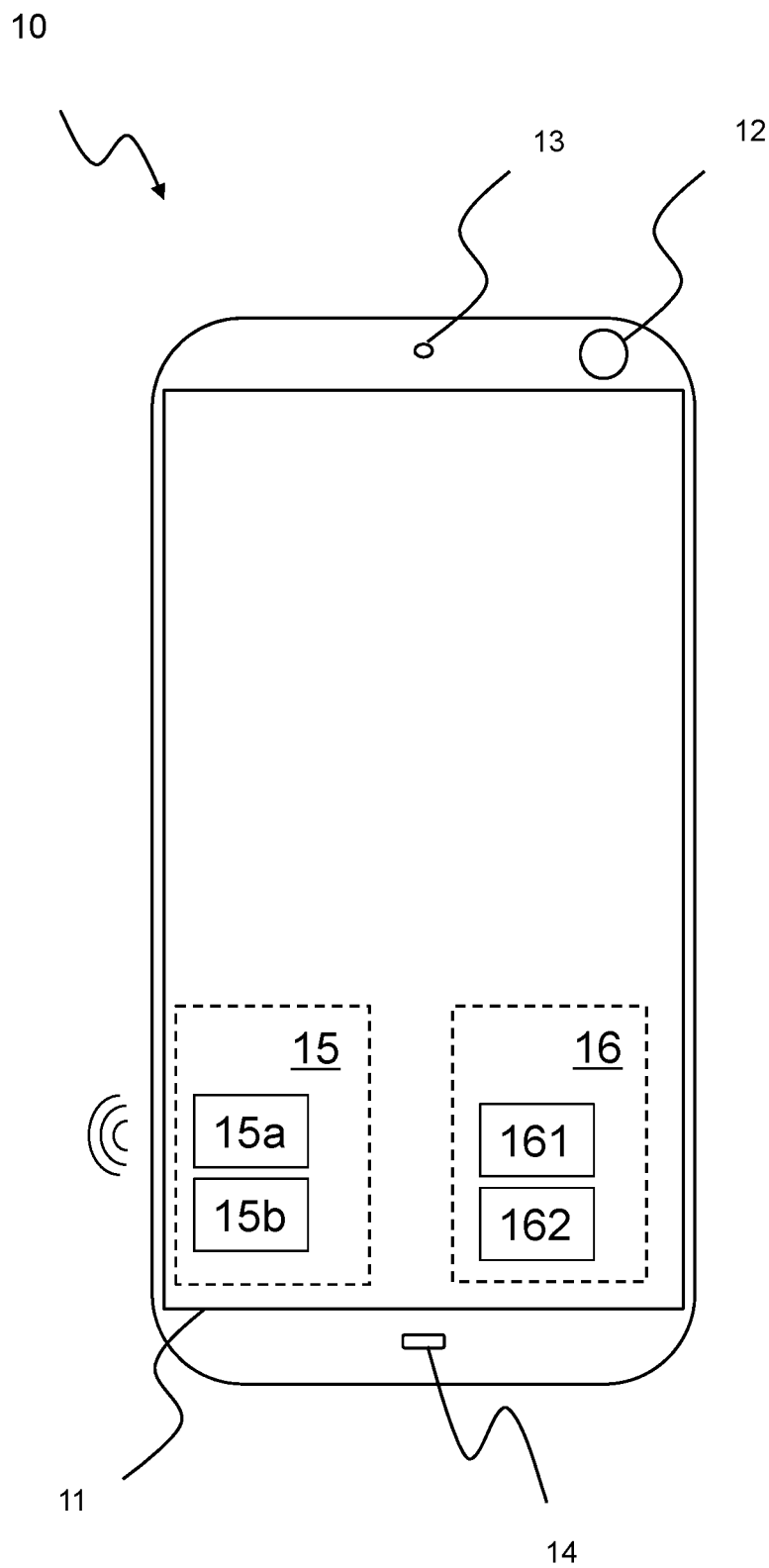
FIG. 7 illustrates an example implementation of an electronic device.

FIG. 7 illustrates an electronic device 10 configured to implement the method (FIG. 5). The electronic device 10 may comprise a touch sensitive display 11, a camera 12, a speaker 13, a microphone 14, a communication interface 15 (comprising a transmitter 15a and a receiver 15b for wireless signals) and a control unit 16.

The camera 12 is arranged to capture images of a user of the first electronic device during a video call. The microphone 14 is arranged to record audio during a video call.

The communication interface 15 is configured to enable communication with a second electronic device 20 e.g. via a cellular network. For example a video call using Internet Protocol may be established between the electronic devices 10, 20. The control unit 16 controls the operation of the first electronic device 10. The control unit 16 typically comprises one or more processors 161 and a memory 162. One or more programs are stored in the memory 162 and configured to be executed by the one or more processors 161. The one or more programs include instructions for displaying on the touch-sensitive display 11 one or more first selectable user interface, UI, objects 111 representing software applications installed on the electronic device, one or more second selectable UI objects 112 representing contacts of a user of the electronic device 10 and a third selectable UI object 113 related to execution of a video call.

The one or more programs also include instructions for determining selection of one of the first selectable UI objects 111 and determining selection of the second selectable UI objects 112.

Furthermore, the one or more programs also include instructions for upon detecting a touch input selecting of the third selectable UI object 113 executing the software application selected by the determining and establishing, using the communication interface 15, a video call between the first electronic device 10 and a second electronic device 20 of the contact selected by the determining in order to exchange data associated with the software application.

In some embodiments, the one or more programs include instructions for receiving, from the second electronic device, a first data stream comprising video data captured by a camera 22 of the second electronic device 20.

In some embodiments, the one or more programs also include instructions for the one or more programs include instructions for sending, using the communication interface 15, to the second electronic device, a second data stream comprising a live steam comprising full-screen content of the touch-sensitive display 11.

In some embodiments, the one or more programs also include instructions for the one or more programs include instructions for sending, to the second electronic device, a second data stream comprising video data captured by the camera 12 of the first electronic device 10 and information identifying the software application selected by the second touch input.

In some embodiments, the one or more programs include instructions for displaying video data exchanged through the video call in at least one foreground inset display area that overlaps a background display area displayed on the touch-sensitive display 11. In some embodiments, a full-screen presentation of the executed software application is displayed in the background display area.

In some embodiments, the one or more programs include instructions for establishing the video call based on a fourth touch input selecting a fourth selectable UI object 114 representing a streaming mode.

In general, the wireless communications device 10 may be configured to perform all aspects of the method described in FIG. 5.

For better understanding of the proposed technique an example implementation of a service that allows two users to stream screen and/or camera along with audio to each other while playing a game, sharing images or watching YouTube together will now be described. The service may also present installed games and application along with recommendations for new ones.

Figure 8:
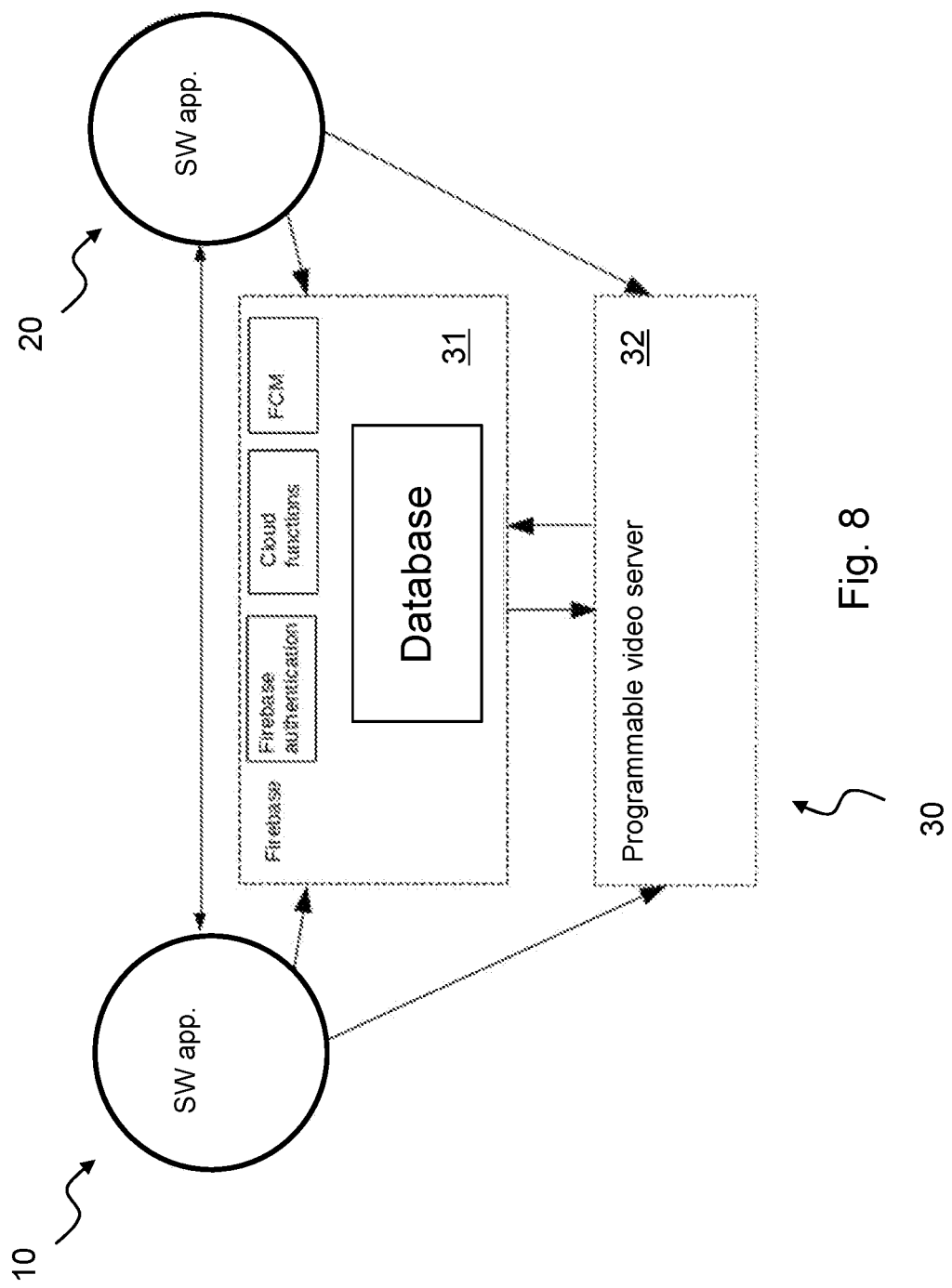
FIG. 8 illustrates an architecture of an application that allows two users to stream screen and/or camera along with audio to each other while sharing information related to a software application.

FIG. 8 illustrates a high level architectural description showing the different building blocks of the example implementation. More specifically, FIG. 8 illustrates two electronic devices 10, 20, referred to as clients, with a special (streaming/gaming) Software application ("SW app") installed thereon. The electronic devices 10, 20 communicate over a server arrangement 30, herein also referred to as a backend. The server arrangement comprises a common software platform 31 and a programmable video server 32.

The clients use the common software platform 31 (e.g. Firebase) as a backend solution due to its ease of use, comprehensive product catalog and integrated features, scalability, authentication support and it's real time database. The common software platform 31 is also used to for example authenticate users (Firebase authentication), store data e.g. user and friend data, session data, invitation data (Database), to provide means to allow two friends to connect to each other (Cloud functions) and to allow friends to send messages to each other (Firebase Cloud Messaging, FCM).

The mobile platform 31 typically also comprises built-in server side support for authentication to different popular federated identity providers such as Facebook, google, twitter etc.

A programmable video library may be used in the electronic devices 10, 20 to setup and stream audio and/or video between two users using a programmable video server 32. The programmable video library is for example a Java/Android wrapper for Google's open source webrtc lib, written in C/C++, and an implementation of the signaling plane/orchestrating.

Most video/audio streaming can be made peer-to-peer as shown with arrow between the two clients 10, 20. If not, data traffic has to go via the programmable video server 32. In this case, there will be some extra latency.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method of a first electronic device with a touch-sensitive display, the method comprising:
  displaying a user interface for configuring and initiating a video call on the touch-sensitive display, wherein displaying the user interface includes simultaneously displaying, prior to any selection input:
one or more first selectable user interface, UI, objects representing software applications installed on the electronic device, separate from a video calling application, that provide content for sharing;
one or more second selectable UI objects representing contacts of a user of the electronic device; and
a third selectable UI object related to executing the video call;
determining selection of one of the first selectable UI objects;
determining selection of the second selectable UI objects;
enabling the third selectable UI object responsive to determining the selection of one of the first selectable UI objects and the selection of the second selectable UI objects; and
upon detecting a touch input selecting of the enabled third selectable UI object,
executing a software application associated with a selection from the first selectable UI objects;
establishing a video call between the first electronic device and a second electronic device of the contact selected by the determining in order to exchange data associated with the software application; and
sending, to the second electronic device, a live data stream comprising full screen content of the touch-sensitive display on which the executed software application is presented.

2. The method according to claim 1, wherein the establishing comprises:
receiving, from the second electronic device, a first data stream comprising:
video data captured by a camera of the second electronic device.

3. The method according to claim 1, wherein the establishing comprises:
sending, to the second electronic device, a second data stream comprising:
video data captured by a camera of the first electronic device and information identifying the software application selected by the second touch input.

4. The method according to claim 1, wherein the sending, to the second electronic device, a second data stream comprising:
video data captured by a camera of the first electronic device and information identifying the software application selected by the second touch input.

5. The method according to claim 1, wherein the method comprises:
displaying video data exchanged through the video call in at least one foreground inset display area that overlaps a background display area displayed on the touch-sensitive display.

6. The method according to claim 5, wherein a full-screen presentation of the executed software application is displayed in the background display area.

7. The method according to claim 1 wherein the software applications comprises games, media players, web browsers, or any other software applications.

8. The method according to claim 1, wherein the establishing is performed based on a touch input selecting a fourth selectable UI object representing a streaming mode.

9. A first electronic device, comprising:
a touch-sensitive display;
one or more processors;
memory; and
one or more programs, wherein the one or more programs are stored in the memory and configured to be executed by the one or more processors, the one or more programs include instructions for, prior to any selection input:
displaying a user interface for configuring and initiating a video call on the touch-sensitive display, wherein displaying the user interface includes simultaneously displaying:
one or more first selectable user interface, UI, objects representing software applications installed on the electronic device, separate from a video calling application, that provide content for sharing;
one or more second selectable UI objects representing contacts of a user of the electronic device; and
a third selectable UI object related to executing the video call;
determining selection of one of the first selectable UI objects,
determining selection of the second selectable UI objects;
enabling the third selectable UI object responsive to determining the selection of one of the first selectable UI objects and the selection of the second selectable UI objects; and
upon detecting a touch input selecting of the enabled third selectable UI object,
executing a software application associated with a selection from the first selectable UI objects;
establishing a video call between the first electronic device and a second electronic device of the selected contact to exchange data associated with the software application; and
sending, to the second electronic device, a live data stream comprising full screen content of the touch-sensitive display on which the executed software application is presented.

10. The electronic device of claim 9, wherein the one or more programs include instructions for:
receiving, from the second electronic device, a first data stream comprising:
video data captured by a camera of the second electronic device.

11. The electronic device of claim 9, wherein the one or more programs include instructions for:
sending, to the second electronic device, a second data stream comprising:
video data captured by a camera of the first electronic device and information identifying the software application selected by the second touch input.

12. The electronic device of claim 9, wherein the one or more programs include instructions for:
sending, to the second electronic device, a second data stream comprising:
video data captured by a camera of the first electronic device and information identifying the software application selected by the second touch input.

13. The electronic device of claim 9, wherein the one or more programs include instructions for:
displaying video data exchanged through the video call in at least one foreground inset display area that overlaps a background display area displayed on the touch-sensitive display.

14. The electronic device of claim 13, wherein a full-screen presentation of the executed software application is displayed in the background display area.

15. The electronic device of claim 9, wherein the establishing is performed based on a touch input selecting a fourth selectable UI object representing a streaming mode.

16. The electronic device of claim 9, comprising:
a control unit, wherein the control unit comprises said one or more processors and said memory.

17. A non-transitory computer-readable medium storing a computer program comprising instructions which, when the program is executed by a computer, cause the computer to carry out a method comprising, at a first electronic device with a touch-sensitive display, prior to any selection input:
  displaying a user interface for configuring and initiating a video call on the touch-sensitive display, wherein displaying the user interface includes simultaneously displaying:
    one or more first selectable user interface, UI, objects representing software applications installed on the electronic device, separate from a video calling application, that provide content for sharing;
    one or more second selectable UI objects representing contacts of a user of the electronic device; and
    a third selectable UI object related to executing the video call;
  determining selection of one of the first selectable UI objects;
  determining selection of the second selectable UI objects;
  enabling the third selectable UI object responsive to determining the selection of one of the first selectable UI objects and the selection of the second selectable UI objects; and
  upon detecting a touch input selecting of the enabled third selectable UI object,
  executing a software application associated with a selection from the first selectable UI objects;
  establishing a video call between the first electronic device and a second electronic device of the contact selected by the determining in order to exchange data associated with the software application, wherein establishing the video call includes sending, to the second electronic device, a second data stream including video data captured by a camera of the first electronic device and information identifying the software application selected by the second touch input and a live data stream comprising full screen content of the touch-sensitive display on which the executed software application is presented.

* * * * *